(12) United States Patent
Doi et al.

(10) Patent No.: US 7,347,077 B2
(45) Date of Patent: Mar. 25, 2008

(54) METHOD OF MANUFACTURING OUTER RING MEMBER FOR CONSTANT VELOCITY JOINT

(75) Inventors: Yoshihisa Doi, Utsunomiya (JP); Kaoru Yamanoi, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 10/580,210

(22) PCT Filed: Nov. 25, 2004

(86) PCT No.: PCT/JP2004/017503

§ 371 (c)(1),
(2), (4) Date: May 23, 2006

(87) PCT Pub. No.: WO2005/051566

PCT Pub. Date: Jun. 9, 2005

(65) Prior Publication Data

US 2007/0101795 A1    May 10, 2007

(30) Foreign Application Priority Data

Nov. 27, 2003    (JP)    ............... 2003-397545
Nov. 27, 2003    (JP)    ............... 2003-397685

(51) Int. Cl.
*B21D 22/00*    (2006.01)
(52) U.S. Cl. .............. 72/356; 72/352; 72/358
(58) Field of Classification Search ............... 72/41, 72/256, 267, 352, 353.2, 354.6, 356, 358, 72/359, 714
See application file for complete search history.

(56) References Cited

U.S. PATENT DOCUMENTS 5,007,266 A * 4/1991 Nishiuchi et al. ............... 72/44

| | | | |
|---|---|---|---|
| 5,186,082 A * | 2/1993 | Kuramitsu et al. | ........ 76/107.1 |
| 6,055,838 A | 5/2000 | Ohama et al. | |
| 7,043,955 B2 * | 5/2006 | Nagao et al. | ............ 72/358 |
| 2003/0050124 A1 * | 3/2003 | Kanamaru et al. | .......... 464/111 |
| 2003/0168126 A1 * | 9/2003 | Oohama et al. | ............ 148/246 |

FOREIGN PATENT DOCUMENTS

| | | |
|---|---|---|
| JP | 55-072919 | 6/1980 |
| JP | 57-206537 | 12/1982 |
| JP | 61-003618 | 1/1986 |
| JP | 61-501831 | 8/1986 |
| JP | 02-034242 | 2/1990 |
| JP | 2-217129 | 8/1990 |
| JP | 02-290640 | 11/1990 |
| JP | 03-060838 | 3/1991 |
| JP | 04-143038 | 5/1992 |
| JP | 04-228238 | 8/1992 |
| JP | 11-179477 | 7/1999 |
| WO | WO 85/03655 | 8/1985 |

* cited by examiner

*Primary Examiner*—Ed Tolan
(74) *Attorney, Agent, or Firm*—Squire, Sanders & Dempsey L.L.P.

(57) ABSTRACT

A method of manufacturing an outer ring member for a constant velocity joint, comprising the steps of forming a secondary molding by applying a preliminary upsetting to a work after applying a forward extrusion-molding to the work, forming intermediate pre-molded bodies having annular sloped surfaces formed thereon to have a difference in flow resistance between large diameter parts and small diameter parts by applying the upsetting to the upper part of the secondary molding, forming a quaternary molding having a cup part with track grooves by applying a backward extrusion-molding to the intermediate pre-molded bodies, and applying an ironing to the cup part of the quaternary molding to finish the quaternary molding to product dimensions.

10 Claims, 17 Drawing Sheets

(INTERMEDIATE PRELIMINARY BODY)

(WORKPIECE)

(PRIMARY FORMED PIECE)

(SECONDARY FORMED PIECE)

(INTERMEDIATE PRELIMINARY BODY)

(QURTERNARY FORMED PIECE)

(COMPLETED PRODUCT)

FIG. 12

| LARGER-DIAMETER PORTIONS ($\alpha$) | SMALLER-DIAMETER PORTION ($\beta$) | ANGLE DIFFERENCE | HOW MATERIAL IS FILLED | FORMED BODY IN NEXT STEP | JUDGEMENT |
|---|---|---|---|---|---|
| 3° | 3° | 0° | △ | PROBLEM IN PLACING FORMED BODY IN DIE | △ |
| | 6° | 3° | ○ | NO PROBLEM | ○ |
| | 9° | 6° | ○ | NO PROBLEM | ○ |
| | 10° | 7° | ○ | NO PROBLEM | ○ |
| | 12° | 9° | ○ | NO PROBLEM | ○ |
| | 15° | 12° | ○ | NO PROBLEM | ○ |
| | 18° | 15° | ◎ | MATERIAL CRACKING | × |

(INTERMEDIATE PRELIMINARY BODY)

METHOD OF MANUFACTURING OUTER RING MEMBER FOR CONSTANT VELOCITY JOINT

This a 35 USC 371 of PCT/JP04/17503 filed Nov. 25, 2004.

TECHNICAL FIELD

The present invention relates to a method of manufacturing an outer race member for a constant-velocity joint for transmitting rotational drive power.

BACKGROUND ART

Heretofore, it has been customary to fill a cavity formed by an upper die and a lower die that are joined to each other, with a forging material, and applying a pressing force to the forging material through a punch, for thereby producing an outer race member (outer cup) of a constant-velocity joint for driving automotive wheels, for example.

The outer race member comprises a tubular cup and a shank integrally formed with the cup. The cup has three axially extending track grooves defined in an inner circumferential surface thereof, and rollers can roll in and along the track grooves.

With respect to the method of manufacturing an outer race member for constant-velocity joints of the type described above, Japanese Laid-Open Patent Publication No. 57-206537, for example, discloses a technical concept for solving the problem of a larger axial elongation of larger-diameter portions and a smaller axial elongation of smaller-diameter portions when a cup-shaped outer member blank having a wall thickness, which is substantially uniform dimension with that of the product dimension, is ironed. According to the disclosed technical concept, the dimensions of the cup-shaped outer member blank are set according to the constant volume law to keep axial elongations substantially constant.

Japanese Laid-Open Patent Publication No. 61-3618 discloses a technical concept for forming a cup-shaped rough product with a shank according to a forging process, the rough product having an inner surface shape which is substantially the same as a finished shape, then setting an inner die on the inner surface of the rough product, and ironing the entire circumference of an outer surface toward the inner surface at uniform ironing ratios in a uniform thicker portion, a uniform thinner portion, and a portion extending from the thicker portion to the thinner portion, thereby finishing a plurality of grooves in the inner surface with high accuracy.

According to the technical concept disclosed in Japanese Laid-Open Patent Publication No. 57-206537, however, since ironing ratios of the bottoms of track grooves, the track grooves, and the inner surface are largely different from each other, the accuracy of the groove surfaces of the track grooves is lower than if the bottoms of track grooves, the track grooves, and the inner surface are ironed with a uniform ironing ratio.

According to the technical concept disclosed in Japanese Laid-Open Patent Publication No. 61-3618, it is premised that the cup-shaped rough product with the shaft which has the inner surface shape which is substantially the same as the finished shape is used as a forging blank (workpiece). If the manufacturing process disclosed in Japanese Laid-Open Patent Publication No. 61-3618 is applied to a workpiece in the form of a cup-shaped intermediate blank that is produced by extruding a billet backwards and has a wall thickness difference between larger-diameter portions and smaller-diameter portions, then the thinner portion is axially extended greater than the thicker portion due to different ironing ratios. Even if the intermediate blank whose axial end face is irregular is ironed at a circumferentially uniform ironing ratio, the end face produced after the blank is ironed still remains irregular, and the amount of finishing work on the axial end face increases.

DISCLOSURE OF THE INVENTION

Problem to be Solved by the Invention

It is a general object of the present invention to provide a method of manufacturing an outer race member for constant-velocity joint, the outer race member having an axial end face with substantially uniform dimensions for achieving increased machining accuracy by causing a larger amount of a forging material to flow in larger-diameter portions than in a smaller-diameter portions of a forging blank when the forging blank is extruded backwards.

Another object of the present invention is to provide a method of manufacturing an outer race member for constant-velocity joint, the outer race member having an axial end face with substantially uniform dimensions for achieving increased machining accuracy when a forging blank is extruded backwards, by providing a process of forming an intermediate preliminary formed body having an annular slanted surface having a uniform tilt angle between larger-diameter portions and smaller-diameter portions.

According to the present invention, an intermediate formed body is shaped such that more material is liable to flow in the larger-diameter portions than in the smaller-diameter portions. Therefore, the axial dimensions of the end face of a cup at the larger-diameter portions and the smaller-diameter portions are substantially uniformized when the intermediate formed body is extruded backwards.

As a result, a quaternary formed piece produced by the backward extrusion is prevented from suffering material localization and the larger-diameter portions have their material plastically flowing better than the smaller-diameter portions, thereby reducing a finishing allowance and also reducing the amount of cutting work as the amount of finishing work.

According to the present invention, furthermore, a process of forming an outer race member for a constant-velocity joint through a plurality of cold forging steps includes the step of forming an intermediate preliminary formed body having an annular slanted surface having a constant tilt angle along larger-diameter portions and smaller-diameter portions thereof. When the intermediate preliminary formed body is extruded backwards in a next step, a plastically deformed material is liable to flow from the smaller-diameter portions along the annular slanted surface toward the larger-diameter portions, and hence the material flows better in the larger-diameter portions than in the smaller-diameter portions. If the area of the annular slanted surface at the larger-diameter portions is greater than the area of the annular slanted surface at the smaller-diameter portions, then a more material flow in the larger-diameter portions is promoted than in the smaller-diameter portions.

BRIEF DESCRIPTION OF THE DRAWINGS

FIG. 12 is a diagram showing experimental results provided when the tilt angle $\alpha$ of larger-diameter portions is constant and the tilt angle $\beta$ of smaller-diameter portions is changed;

BEST MODE FOR CARRYING OUT THE INVENTION

Figure 1:
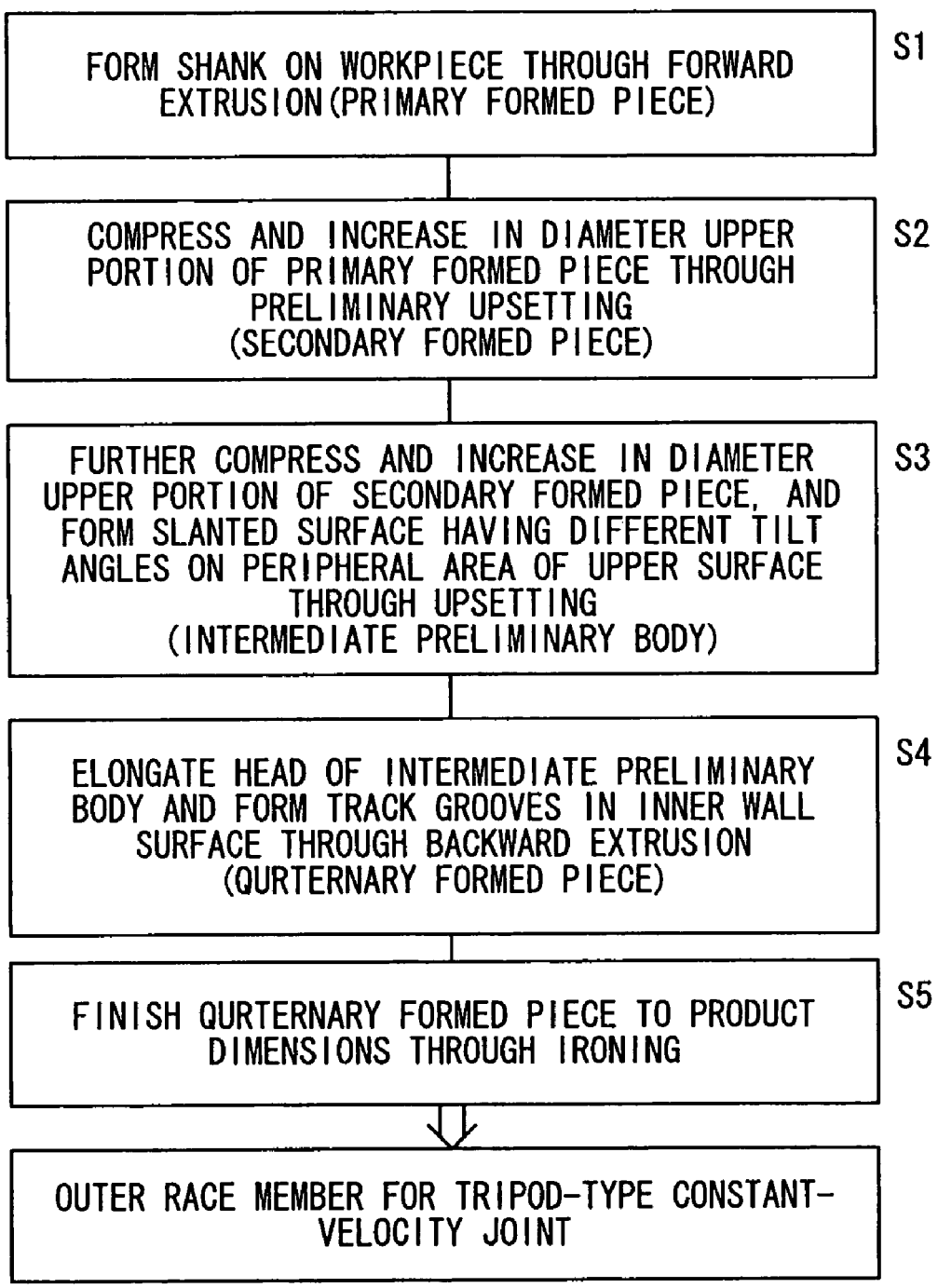
FIG. 1 is a flowchart of a process of manufacturing an outer race member for a constant-velocity joint according to an embodiment of the present invention.
Figure 2:
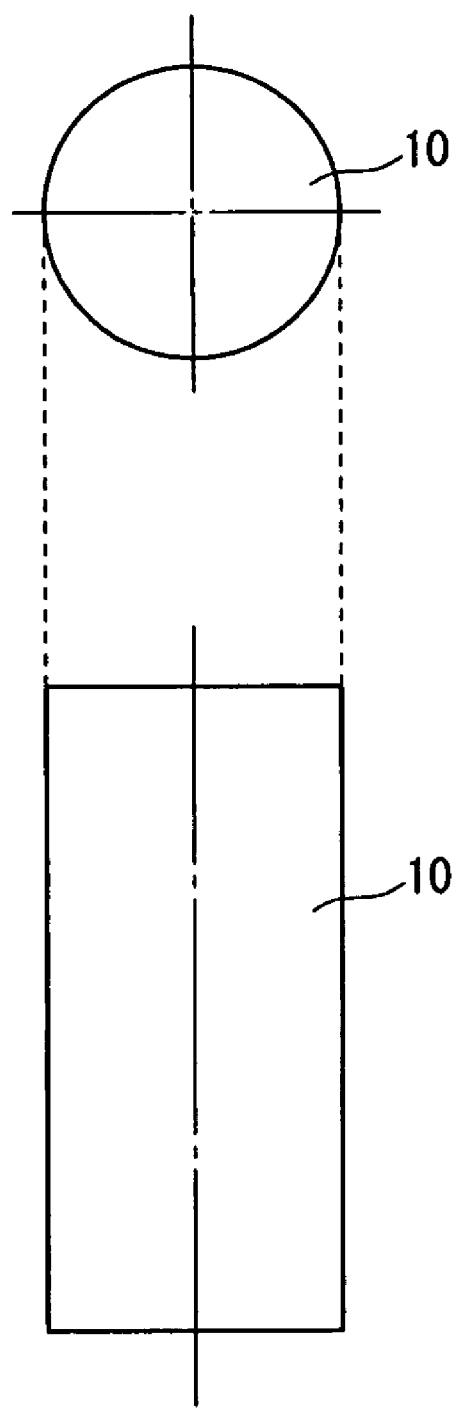
FIG. 2 is a side elevational view and a plan view of a workpiece in the form of a cylinder cut to a predetermined length.

A process of manufacturing an outer race member for a constant-velocity joint according to an embodiment of the present invention is illustrated in FIG. 1. As shown in the flowchart of FIG. 1, a workpiece 10 in the form of a cylinder of carbon steel is cold-forged a total of 5 times to finally manufacture an outer race member for a tripod-type constant-velocity joint.

The manner in which the shape of the workpiece 10 changes through the manufacturing process is illustrated in FIGS. 2 through 7.

In a first preparatory step, a workpiece 10 (see FIG. 2) cut in the form of a cylinder having a predetermined length is treated by spheroidizing annealing. The workpiece 10 is softened and can easily be treated in first through fifth cold-forging steps described below.

In a second preparatory step, the workpiece 10 is coated with a lubricating chemical film. Specifically, a lubricating chemical film of zinc phosphate is formed on the surface of the workpiece 10 by bonderizing to make the surface lubricative. Such a lubricating chemical film may be formed by immersing the workpiece 10 in a solvent with zinc phosphate or the like dissolved therein for a predetermined period of time.

Then, in first cold forging step S1, the workpiece 10 coated with the lubricating chemical film is extruded forwards. Specifically, the workpiece 10 is loaded into a workpiece retainer in a first forging die which has a shank forming cavity, not shown. The shank forming cavity is smaller in diameter than the workpiece 10, with a tapered surface provided between the shank forming cavity and the workpiece retainer.

Then, an end face of the workpiece 10 is pressed toward the shank forming cavity. The other end face portion of the workpiece 10 is pressed into the shank forming cavity, producing a primary formed piece (primary formed body) 16 (see FIG. 3) including a tapered reduced-diameter portion 12 and a shank 14 in the other end face portion. Since the portion of the workpiece 10 which is loaded in the workpiece retainer is essentially not plastically deformed, the primary formed piece 16 has an upper portion 18 whose diameter corresponds to the diameter of the workpiece 10.

Then, in second cold forging step S2, the primary formed piece 16 is preliminarily upset. Specifically, the primary formed piece 16 is loaded into a cavity in a second forging die, not shown. At this time, the shank 14 is inserted into a shank retainer in the second forging die.

The tip end of the shank 14 inserted in the shank retainer is supported by a stop member, not shown, and the upper portion 18 of the primary formed piece 16 is pressed and squeezed by a punch. As the upper portion 18 is squeezed, the upper portion 18 is compressed into a greater diameter, producing a secondary formed piece (secondary formed body) 20 (see FIG. 4).

Figure 5:
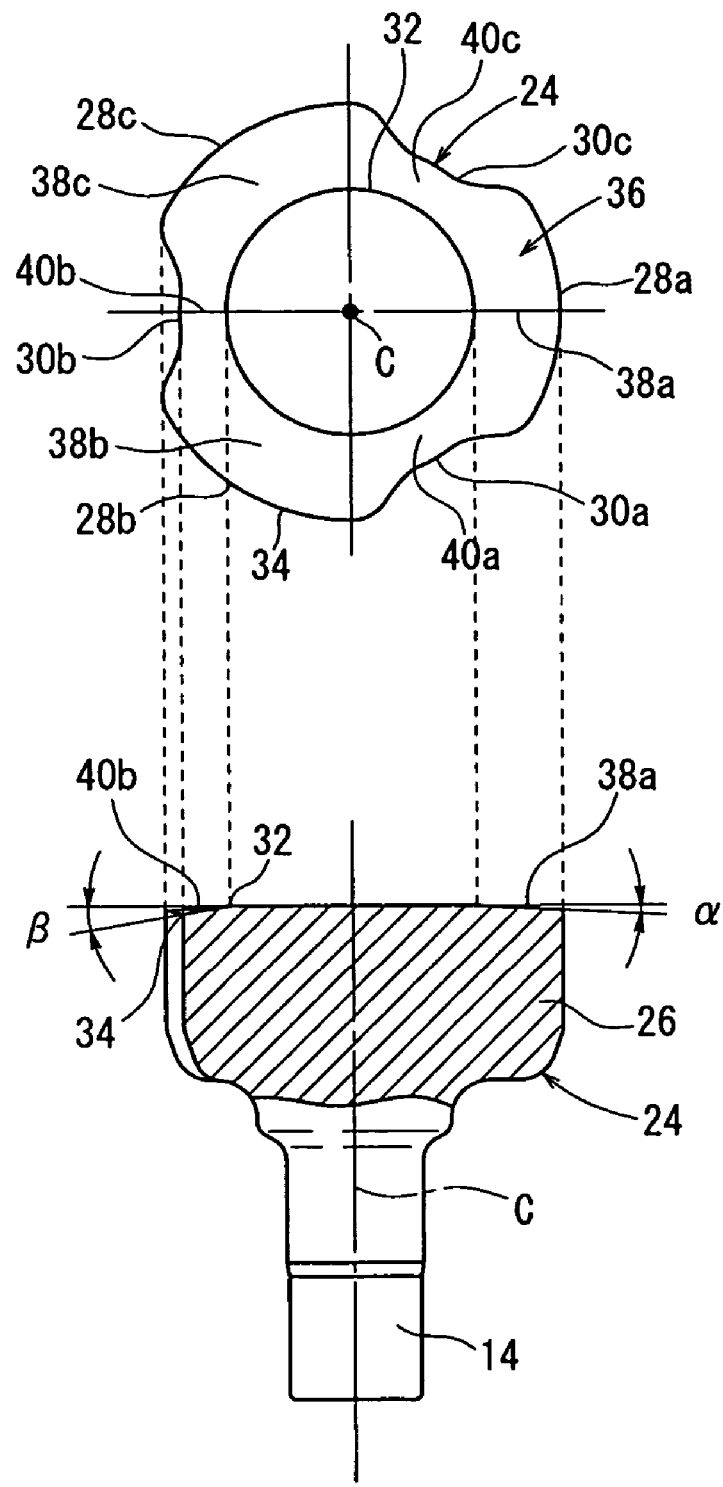
FIG. 5 is a side elevational view and a plan view of an intermediate preliminary formed body produced when the secondary formed body is upset.
Figure 10:
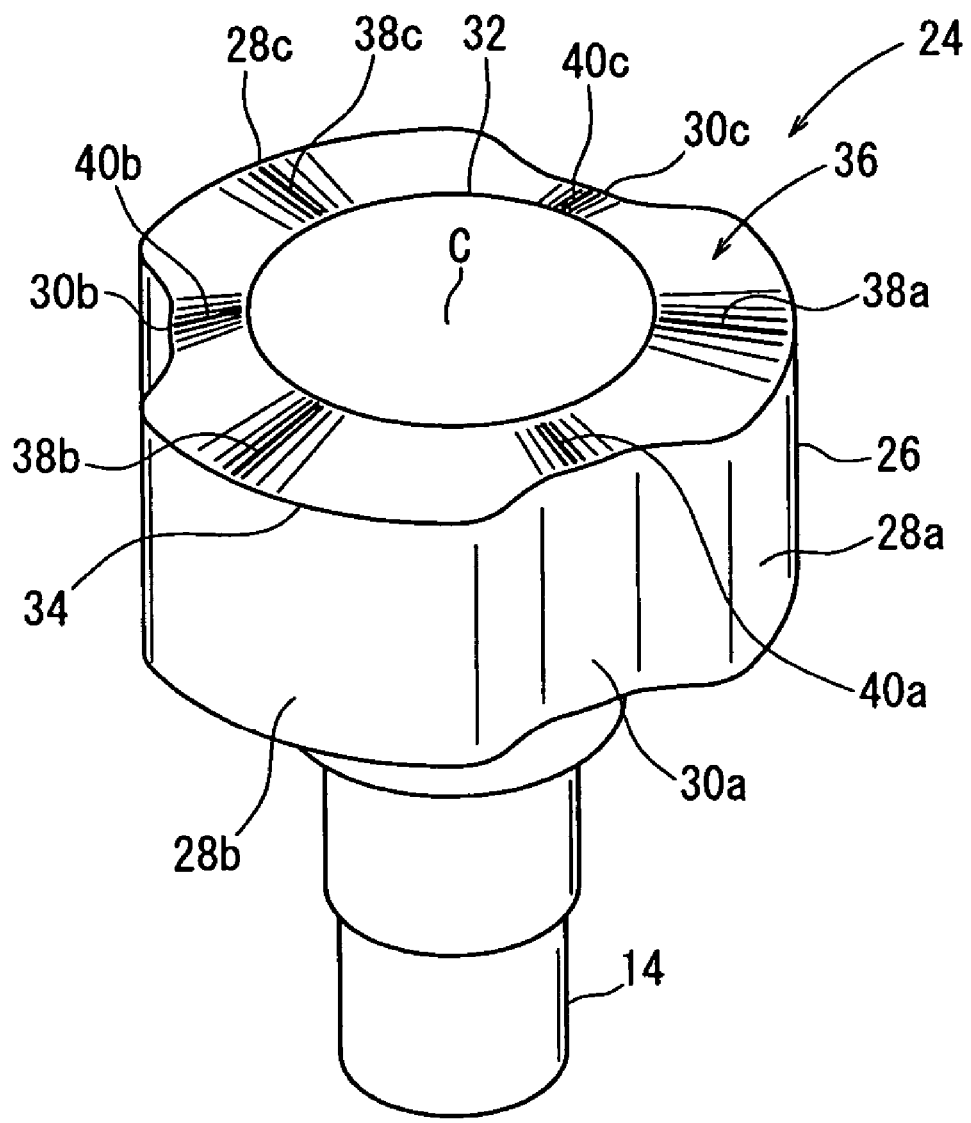
FIG. 10 is a perspective view of the intermediate preliminary formed body shown in FIG. 5.

Then, in third cold forging step S3, the secondary formed piece 20 is further upset to compress an upper portion 22 thereof into a larger diameter, forming an intermediate preliminary formed body 24 as a tertiary formed piece (see FIGS. 5 and 10).

Figure 8:
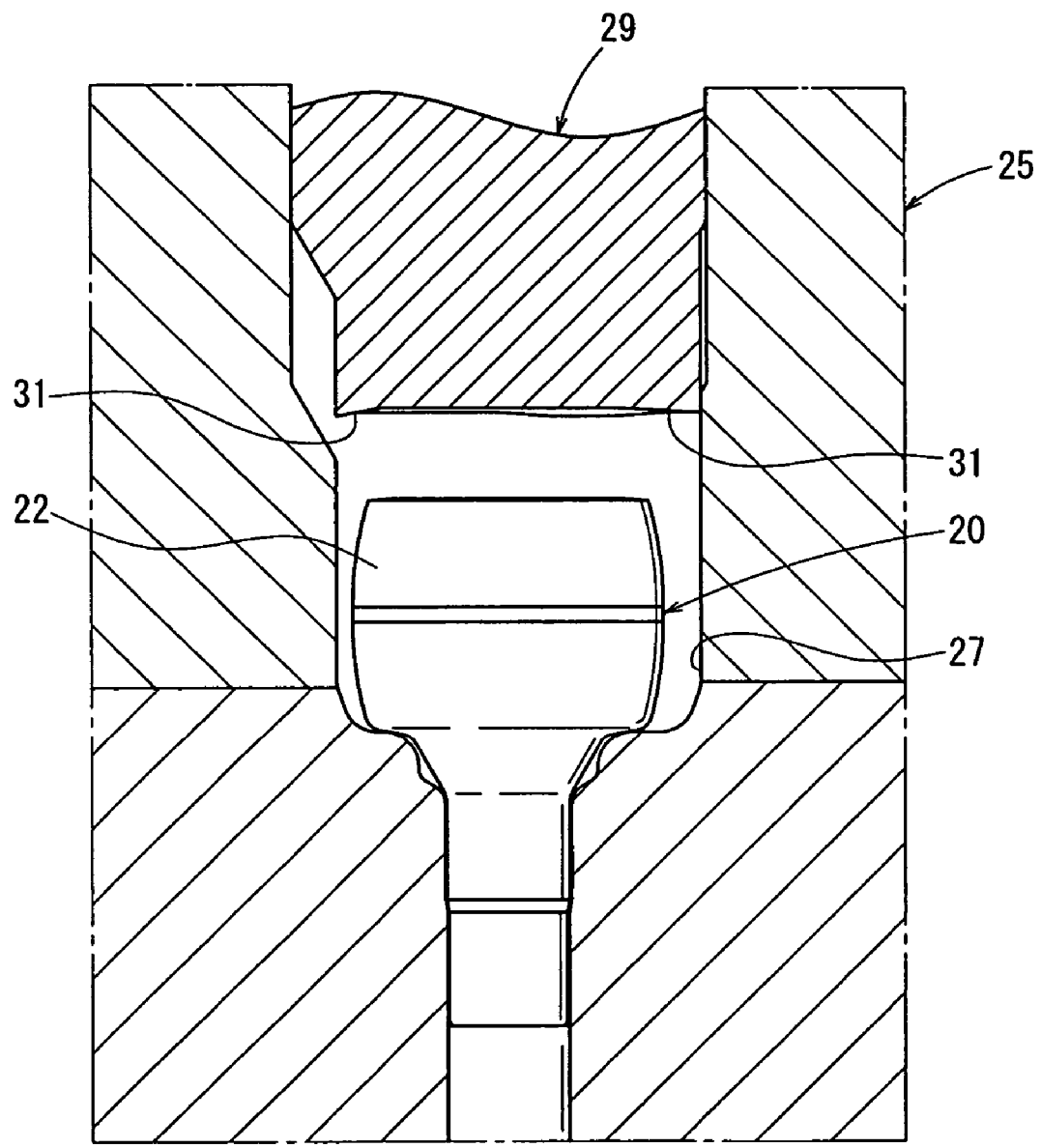
FIG. 8 is a vertical cross-sectional view, partly omitted from illustration, of a third forging die for forming the intermediate preliminary formed body shown in FIG. 5.

Specifically, the secondary formed piece 20 is loaded into a cavity 27 in a third forging die (preliminary forming die) 25 shown in FIG. 8, and the upper portion 22 of the secondary formed piece 20 is pressed by a punch 29, producing the intermediate preliminary formed body 24 (tertiary formed piece) with the upper portion 22 being axially deformed under compression.

Figure 9:
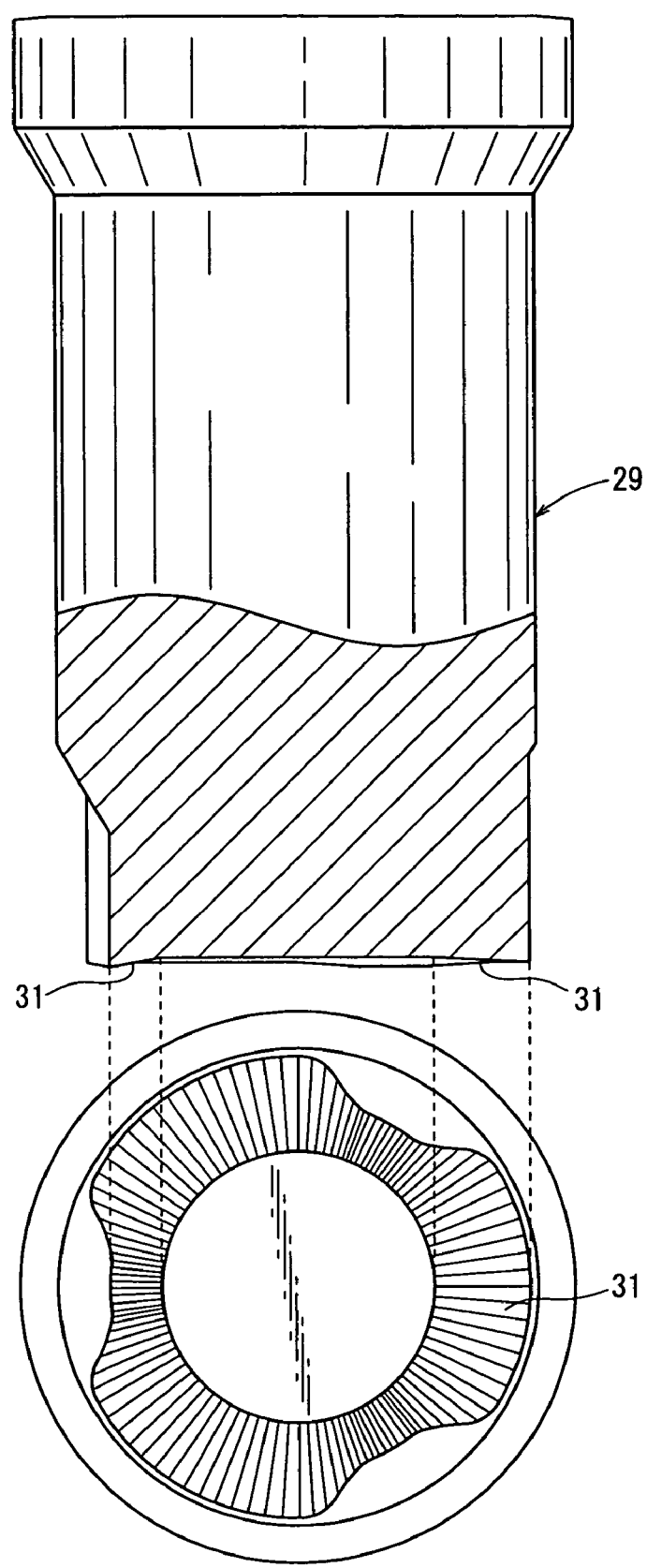
FIG. 9 is a side elevational view, partly cut away, and a bottom view of a punch of the third forging die shown in FIG. 8.

As shown in FIG. 9, the punch 29 has on its tip end face a slightly concave circular central area and an annular slanted surface forming portion 31 rising from the circular concave area radially outwardly toward a peripheral edge. The slanted surface forming portion 31 has a circumferential slanted surface whose tilt angle varies continuously in a pattern corresponding to first slanted surfaces and second slanted surfaces to be described later.

As shown in FIGS. 5 and 10, the intermediate preliminary formed body 24 comprises a disk-shaped head 26 thinner and larger in diameter than the upper portion 22 of the secondary formed piece 20, and a shank 14 reduced in diameter and integrally extending from a lower portion of the head 26 axially by a predetermined length.

As viewed in plan, the head 26 has three petal-shaped larger-diameter portions 28a through 28c projecting radially outwardly a predetermined length and angularly spaced about 120 degrees circumferentially, and three curved and recessed smaller-diameter portions 30a through 30c each disposed between adjacent ones of the larger-diameter portions 28a through 28c.

The head 26 has on its upper end an annular slanted surface 36 disposed between a circular ridge 32 extending around the axis C and a peripheral ridge 34 of the larger-diameter portions 28a through 28c and the smaller-diameter portions 30a through 30c. The annular slanted surface 36 comprises a slanted surface which is lowered from the circular ridge 32 close to the center toward the radially outer peripheral ridge 34. The annular slanted surface 36 has different tilt angles corresponding to the larger-diameter portions 28a through 28c and the smaller-diameter portions 30a through 30c.

Specifically, the annular slanted surface 36 includes three first slanted facets 38a through 38c interconnecting the center (axis C) and the centers of the larger-diameter portions 28a through 28c, and the first slanted facets 38a through 38c have a tilt angle α of about 3 degrees with respect to the horizontal plane. The annular slanted surface 36 also includes three second slanted facets 40a through 40c interconnecting the center (axis C) and the centers of the smaller-diameter portions 30a through 30c, and the second slanted facets 40a through 40c have a tilt angle β of about 10 degrees with respect to the horizontal plane. Between the first slanted facets 38a through 38c at the centers of the larger-diameter portions 28a through 28c and the second slanted facets 40a through 40c at the centers of the smaller-diameter portions 30a through 30c, the tilt angle varies (increases and decreases) continuously circumferentially from the first slanted facets 38a through 38c (or the second slanted facets 40a through 40c) toward the second slanted facets 40a through 40c (or the first slanted facets 38a through 38c).

Stated otherwise, on the annular slanted surface 36 whose tilt angle (with respect to the horizontal plane) varies continuously circumferentially, the tilt angle α at the centers of the larger-diameter portions 28a through 28c connected to the center (axis C) is set to the smallest value, and the tilt angle β at the centers of the smaller-diameter portions 30a through 30c connected to the center (axis C) is set to the largest value.

The tilt angle α at the centers of the larger-diameter portions 28a through 28c and the tilt angle β at the centers of the smaller-diameter portions 30a through 30c are not limited to 3 degrees and 10 degrees, respectively, as referred to above, but may be set to such values that the tilt angle β is greater than the tilt angle α (α<β) and the angle difference between the tilt angle α of the larger-diameter portions 28a through 28c and the tilt angle β of the smaller-diameter portions 30a through 30c ranges from 3 degrees to 12 degrees. This is because the tilt angle β of the smaller-diameter portions 30a through 30c which have a smaller material-flow resistance is made greater than the tilt angle α of the larger-diameter portions 28a through 28c which have a greater material-flow resistance, providing an appropriate material-flow resistance difference between the larger-diameter portions 28a through 28c and the smaller-diameter portions 30a through 30c.

Experimental results produced when the tilt angle α of the larger-diameter portions 28a through 28c was set to a constant value of 3 degrees and the angle difference between the tilt angle α of the larger-diameter portions 28a through 28c and the tilt angle β of the smaller-diameter portions 30a through 30c was varied, are shown in FIG. 12.

According to the experimental results, when the angle difference between the tilt angle α of the larger-diameter portions 28a through 28c and the tilt angle β of the smaller-diameter portions 30a through 30c was 0 degree, a problem arose in placing the workpiece into the die in the next forging step, and the angle difference was not suitable for mass production. When the angle difference between the tilt angle α and the tilt angle β was 15 degrees, the step portions joining the larger-diameter portions 28a through 28c and the smaller-diameter portions 30a through 30c suffered material cracking.

It can thus be seen from the experimental results shown in FIG. 12 that the angle difference between the tilt angle α of the larger-diameter portions 28a through 28c and the tilt angle β of the smaller-diameter portions 30a through 30c should be set to a value in the range from 3 degrees to 12 degrees.

As shown in FIG. 5, the radial width of the annular slanted surface 36 is largest at the centers of the larger-diameter portions 28a through 28c and smallest at the centers of the smaller-diameter portions 30a through 30c.

Figure 3:
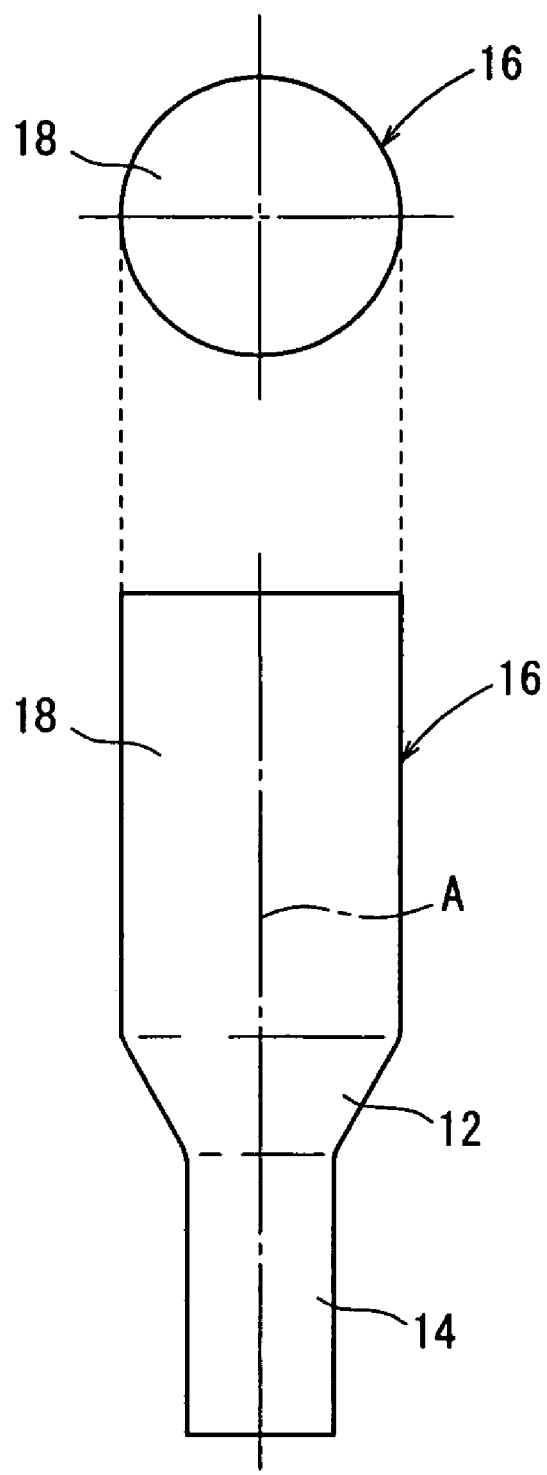
FIG. 3 is a side elevational view and a plan view of a primary formed body produced when the workpiece is extruded forwards.
Figure 4:
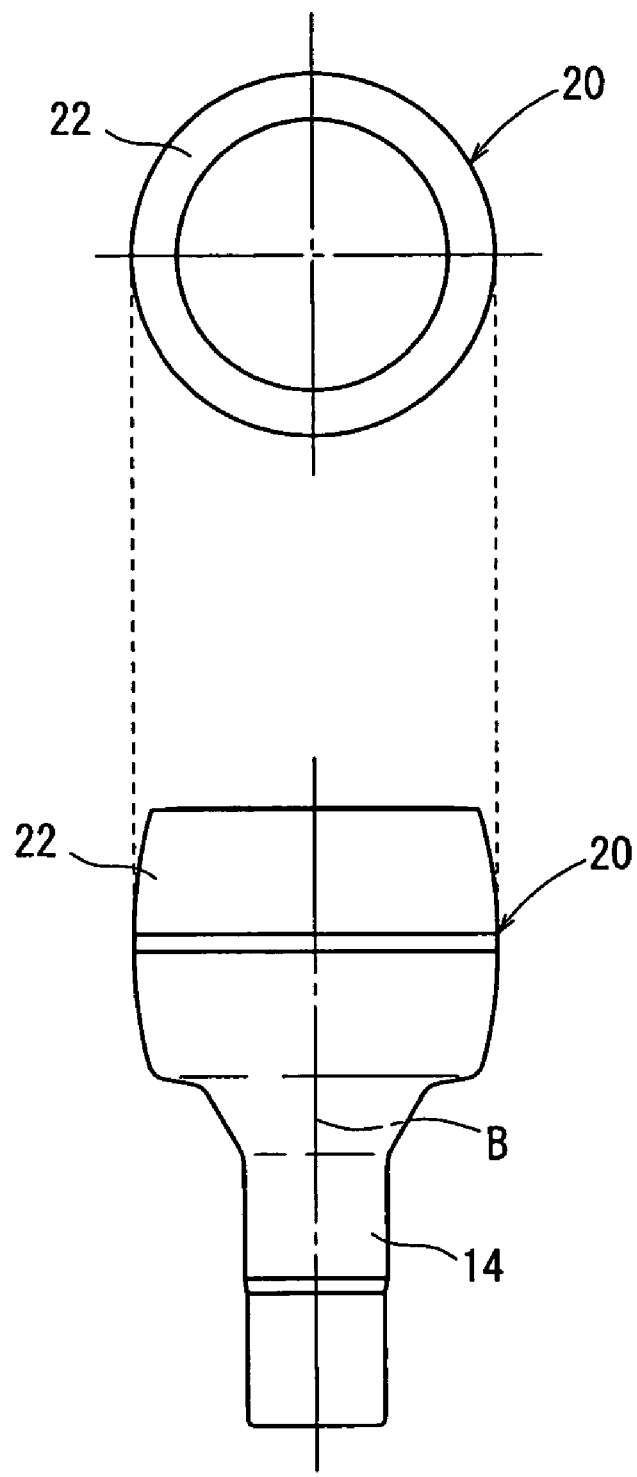
FIG. 4 is a side elevational view and a plan view of a secondary formed body produced when the primary formed body is preliminarily upset.

The primary formed piece 16 and the secondary formed piece 20 are symmetrical (axially symmetrical) in vertical cross section with respect to respective axes A, B thereof (see FIGS. 3 and 4). However, the intermediate preliminary formed body 24 as the tertiary formed piece is asymmetrical in vertical cross section with respect to the axis C (see FIG. 5).

Heretofore, completed products as outer race members for constant-velocity joints have a cup whose outer circumferential surface is cylindrical, and the cup is recessed for material removal to meet demands for lightweight outer race members. The recessed cup is asymmetrical in vertical cross section with respect to an axis thereof.

After third cold forging step S3 is finished, the intermediate preliminary formed body 24 is annealed at a low temperature for removing stresses therefrom, the annealed intermediate preliminary formed body 24 is treated by shot blasting to remove oxide scales, etc. produced by the low-temperature annealing, and a lubricating chemical film of zinc phosphate or the like is formed on the outer surface of the intermediate preliminary formed body 24 by bonderizing. By performing these processes on the intermediate preliminary formed body 24 (tertiary formed piece) can easily be plastically deformed.

Figure 11:
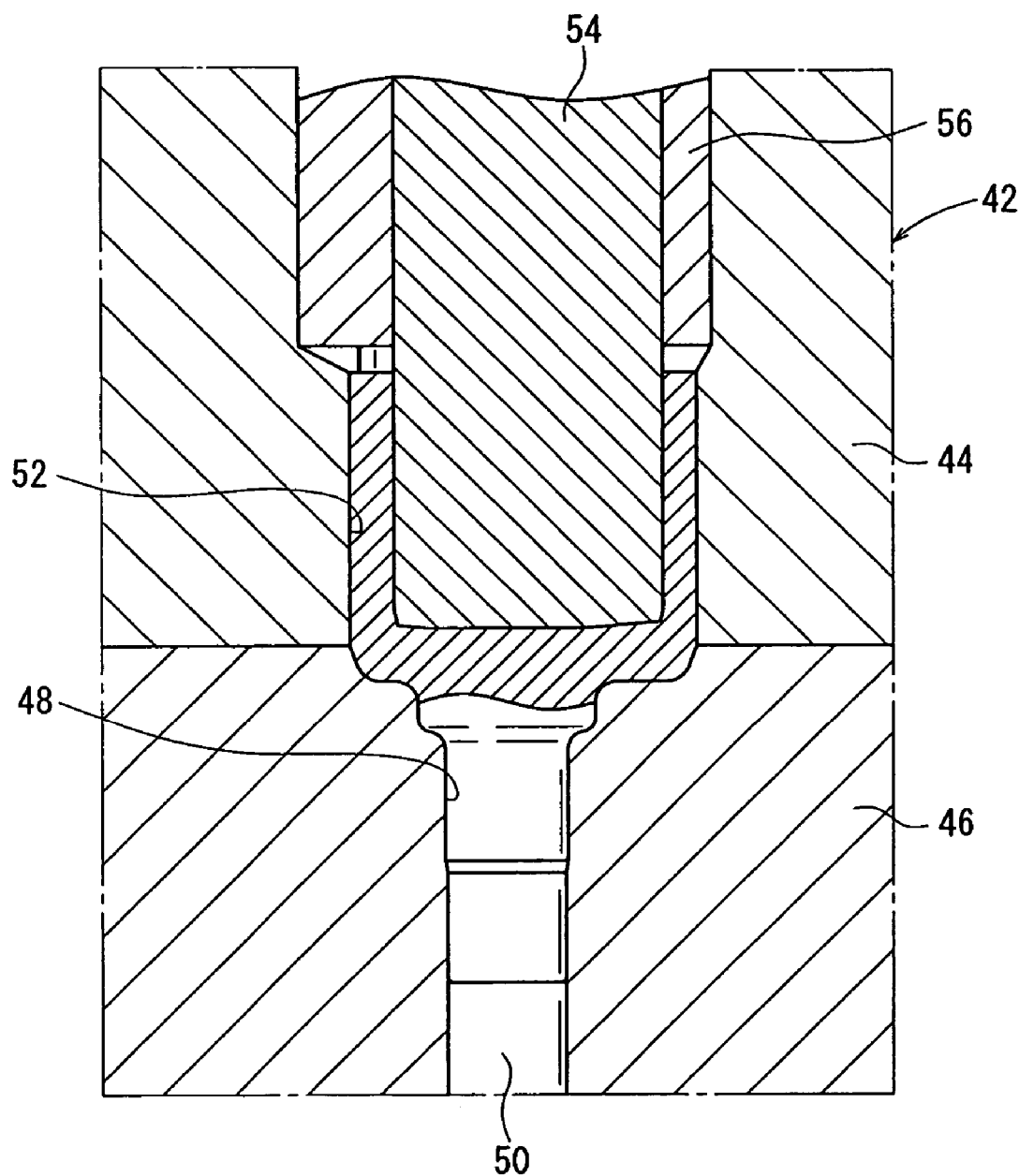
FIG. 11 is a vertical cross-sectional view, partly omitted from illustration, of a fourth forging die for performing backward forging on the intermediate preliminary formed body.

Thereafter, fourth cold forging step S4 is performed using a fourth forging die 42 shown in FIG. 11.

The fourth forging die 42 has an upper die 44 and a lower die 46 which are integrally joined to each other by an insert member (not shown) fitted thereon. The lower die 46 has a shank insertion hole 48 for the insertion therein of the shank 14 of the intermediate preliminary formed body 24 (tertiary formed piece). Directly vertically below the shank insertion hole 48, there is disposed a knockout pin 50 that can be lifted or lowered through a through hole. The upper die 44 has a cup forming cavity 52 defined in an inner wall thereof.

A guide sleeve 56 in the form of a hollow metal cylinder is fitted over a punch 54 for smoothly lifting or lowering the punch 54 along a guide surface of the upper die 44.

Figure 6:
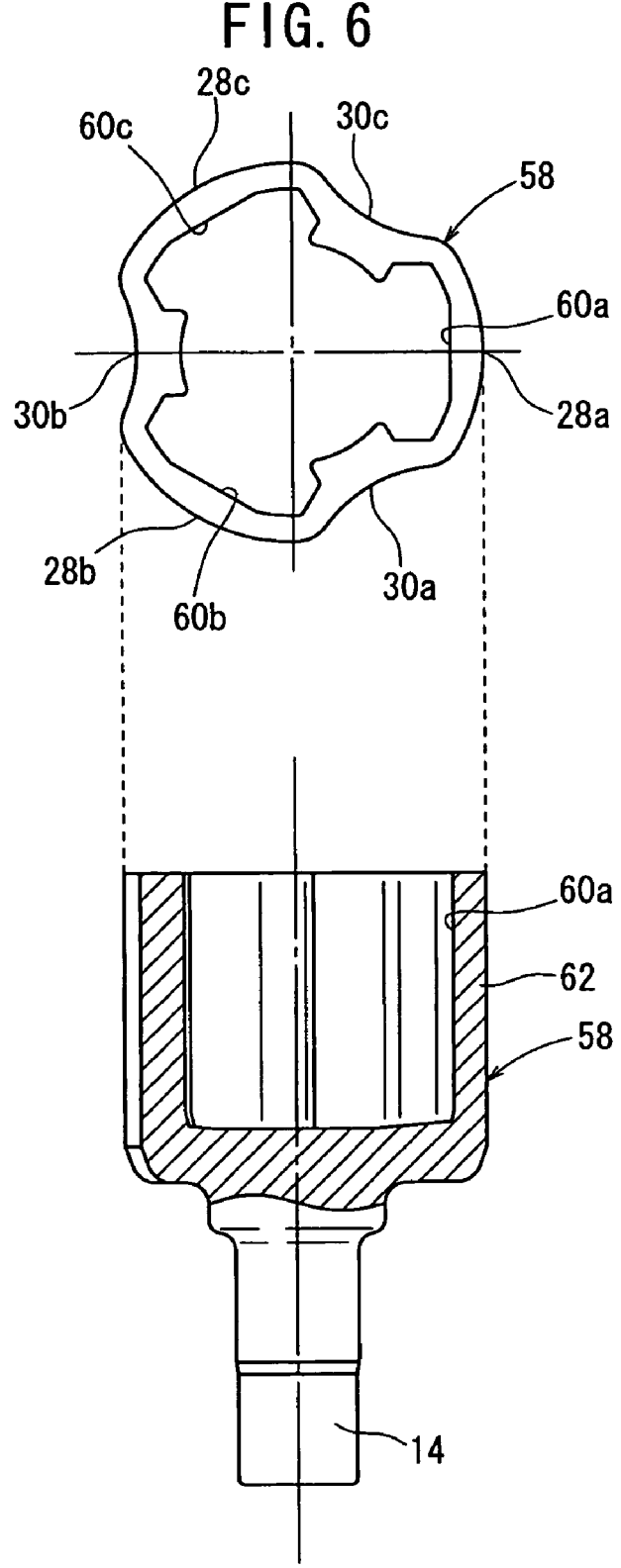
FIG. 6 is a side elevational view and a plan view of a quaternary formed body produced when the intermediate preliminary formed body shown in FIG. 5 is extruded backwards.
Figure 7:
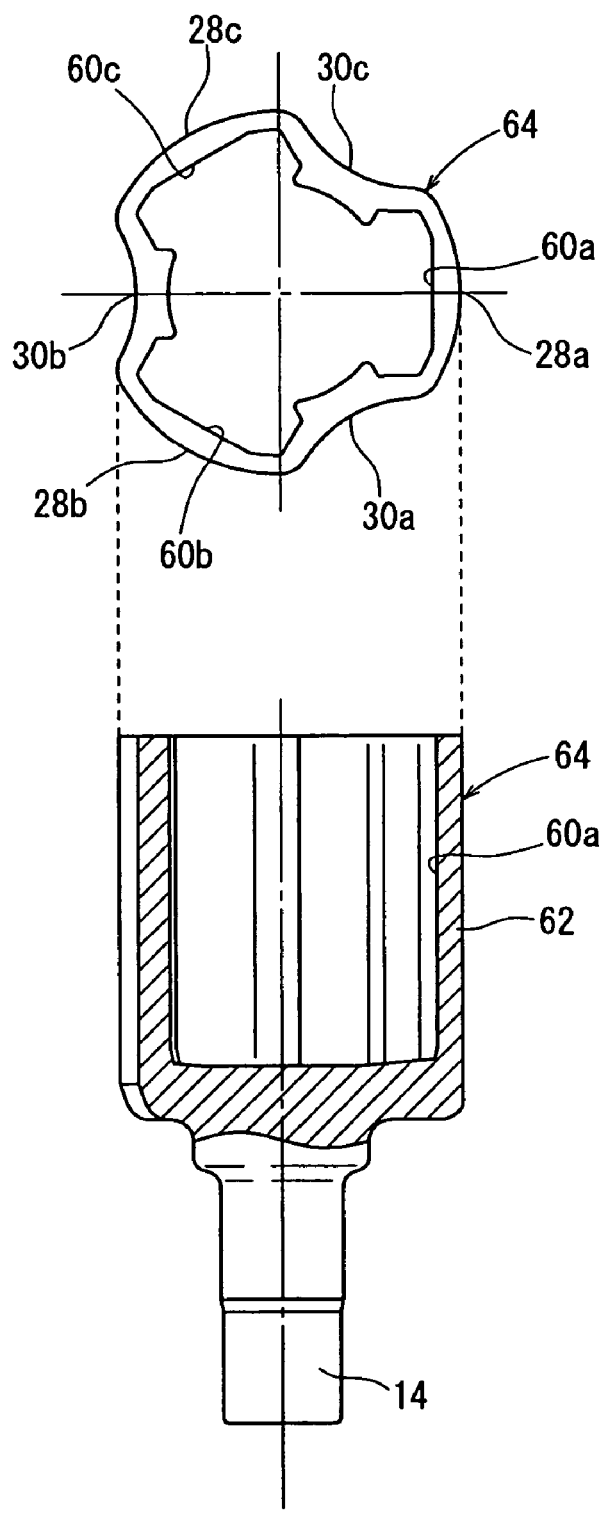
FIG. 7 is a side elevational view and a plan view of a completed product as an outer race member for a tripod-type constant-velocity joint produced when the quaternary formed body is ironed.

The punch 54 has three ridges (not shown) angularly spaced circumferentially by 120 degrees and extending a predetermined length along the axis of the punch 54. The ridges produce track grooves 60a through 60c in an inner wall surface of a cup 62 of a quaternary formed piece 58 as shown in FIG. 6. In fifth cold forging step S5 to be described later, the cup 62 is ironed to process the track grooves 60a through 60c into track grooves 60a through 60c (see FIG. 7) having improved shape and dimensional accuracy.

The punch 54 can be lifted or lowered by a machine press, not shown. The machine press includes a ram (not shown) to which there is coupled a vertically movable member (not shown) that is vertically displaceable in unison with the ram. The punch 54 is fixed to the vertically movable member through a jig.

The fourth cold forging step, i.e., backward extrusion, is performed on the intermediate preliminary formed body 24 (tertiary formed piece) whose shank 14 is inserted in the shank insertion hole 48 in the fourth forging die 42, as follows:

When the shank 14 of the intermediate preliminary formed body 24 is loaded into and along the shank insertion hole 48 in the lower die 46, a uniform clearance which has a predetermined width (e.g., ranging from 0.2 to 0.3 mm) and is uniform circumferentially is provided between the wall surface of the cup forming cavity 52 defined in the inner wall of the upper die 44 and the outer wall surface of the intermediate preliminary formed body 24 which includes the larger-diameter portions 28a through 28c and the smaller-diameter portions 30a through 30c.

First, the machine press is actuated to lower the vertically movable member coupled to the ram of the machine press. In unison with the vertically movable member, the punch 54 is lowered into abutment against the upper surface of the head 26 of the intermediate preliminary formed body (tertiary formed piece) 24.

The punch 54 is further lowered to press the head 26 of the intermediate preliminary formed body 24, plastically deforming the head 26. At this time, the larger-diameter portions 28a through 28c and the smaller-diameter portions 30a through 30c of the intermediate preliminary formed body 24 plastically flow in a direction (upward direction) which is opposite to the direction in which the punch 54 is lowered along the outer circumferential surface of the punch 54, while the plastic flow of the larger-diameter portions 28a through 28c and the smaller-diameter portions 30a through 30c is being limited by the inner wall surface of the cup forming cavity 52.

As the larger-diameter portions 28a through 28c are extended by the plastic flow, the ridges of the punch 54 form track grooves 60a through 60c, which are oriented in the axial direction of the intermediate preliminary formed body (tertiary formed piece) 24, on the inner wall surface of the cup 62.

Thereafter, the machine press is actuated to lift the punch 54 in unison with the ram and the vertically movable member. The knockout pin 50 is elevated to expose the quaternary formed piece 58 shown in FIG. 6.

Usually, when a forging blank (workpiece) is extruded backwards, the amount of backward elongation (the amount of plastic flow) is smaller in the larger-diameter portions than in the smaller-diameter portions, tending to cause cracking, material localization, etc. due to different deformation resistances (ductilities) of the forging blank, for example.

According to the present embodiment, the tilt angle α of the larger-diameter portions 28a through 28c of the annular slanted surface 36 of the intermediate preliminary formed body 24 is smaller than the tilt angle β of the smaller-diameter portions 30a through 30c, providing a material-flow resistance difference between the larger-diameter portions 28a through 28c and the smaller-diameter portions 30a through 30c. Based on the material-flow resistance difference, the amounts of plastic flow of the larger-diameter portions 28a through 28c and the smaller-diameter portions 30a through 30c are made different from each other when the intermediate preliminary formed body 24 is extruded backwards, allowing the material to flow better in the larger-diameter portions 28a through 28c than in the smaller-diameter portions 30a through 30c.

According to the present embodiment, therefore, since the intermediate preliminary formed body 24 is shaped such that more material is liable to flow in the larger-diameter portions 28a through 28c than in the smaller-diameter portions 30a through 30c, the axial dimensions of the end face of the cup 62 at the larger-diameter portions 28a through 28c and the smaller-diameter portions 30a through 30c are substantially uniformized when the intermediate preliminary formed body 24 is extruded backwards.

As a result, according to the present embodiment, the quaternary formed piece 58 produced by the backward extrusion is prevented from suffering material localization and the larger-diameter portions 28a through 28c have their material plastically flowing well, thereby reducing the amount of finishing work (the amount of cutting work) in a subsequent step.

According to the present embodiment, as described above, prior to fourth cold forging step S4 for performing backward extrusion, the intermediate preliminary formed body 24 (tertiary formed piece) is formed to increase the accuracy of a completed product to be formed in a subsequent step and reduce the amount of finishing work in a subsequent step.

After fourth cold forging step S4 has been performed, fifth cold forging step S5 is performed on the quaternary formed piece 58. Before fifth cold forging step S5 is performed, either one of the surface of the quaternary formed piece 58 and a fifth forging die (not shown) may be coated with a liquid lubricant to avoid seizure on the quaternary formed piece 58 or the fifth forging die while fifth cold forging step S5 is being performed. The liquid lubricant may be a known liquid lubricant that has heretofore been used.

In fifth cold forging step S5, the non-illustrated fifth forging die is used to effect ironing (final sizing) on inner and outer surfaces of the quaternary formed piece 58 in order to finish the cup 62 to a final product shape. Specifically, the quaternary formed piece 58 is machined so that the wall thickness of the cup 62 and the width and depth of the track grooves 60a through 60c are of given dimensional accuracy, thereby producing an outer race member for tripod-type constant-velocity joints as a completed product 64 (see FIG. 7) wherein the cup 62 has required dimensional accuracy including the shape of the track grooves 60a through 60c, etc.

With the manufacturing process according to the present embodiment, prior to the backward extrusion in fourth cold forging step S4, the intermediate preliminary formed body 24 having the annular slanted surface 36 which provides the material-flow resistance difference between the larger-diameter portions 28a through 28c and the smaller-diameter portions 30a through 30c is formed to increase the product accuracy and quality stability of the completed product 64.

Figure 13:
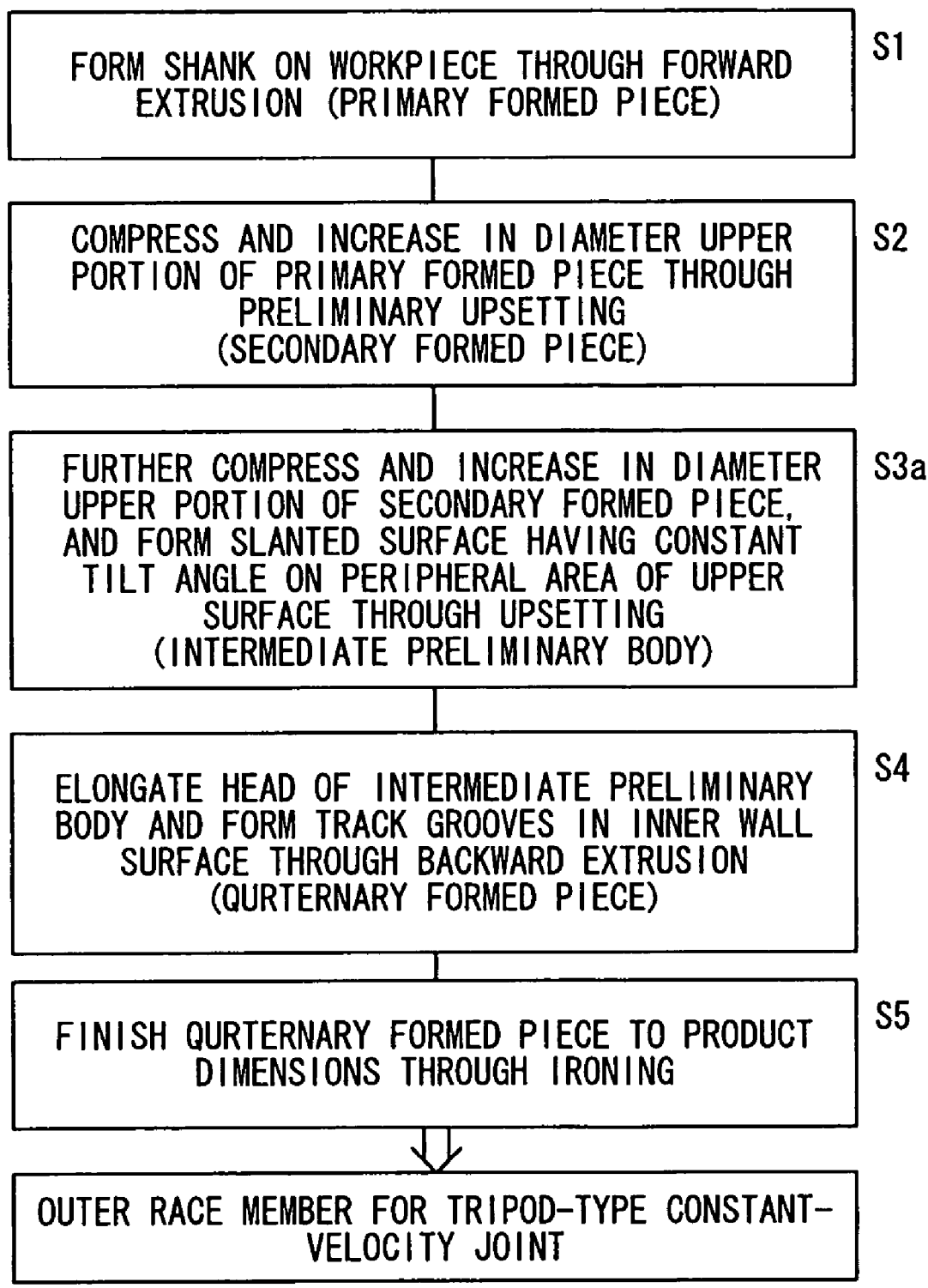
FIG. 13 is a flowchart of a process of manufacturing an outer race member for a constant-velocity joint according to another embodiment of the present invention.

FIG. 13 shows a process of manufacturing an outer race member for a constant-velocity joint according to another embodiment of the present invention. Those parts according to the other embodiment which are identical to those of the previous embodiment are denoted by identical reference characters, and will not be described in detail below. As indicated by the flowchart shown in FIG. 13, the process of manufacturing an outer race member for a constant-velocity joint according to the other embodiment differs from the manufacturing process according to the embodiment shown in FIG. 1 only as to third cold forging step S3a for forming an intermediate preliminary formed body 24a as a tertiary formed piece, and has other steps than third cold forging step S3a identical to those of the previous embodiment. Therefore, those other steps will not be described in detail below.

Figure 14:
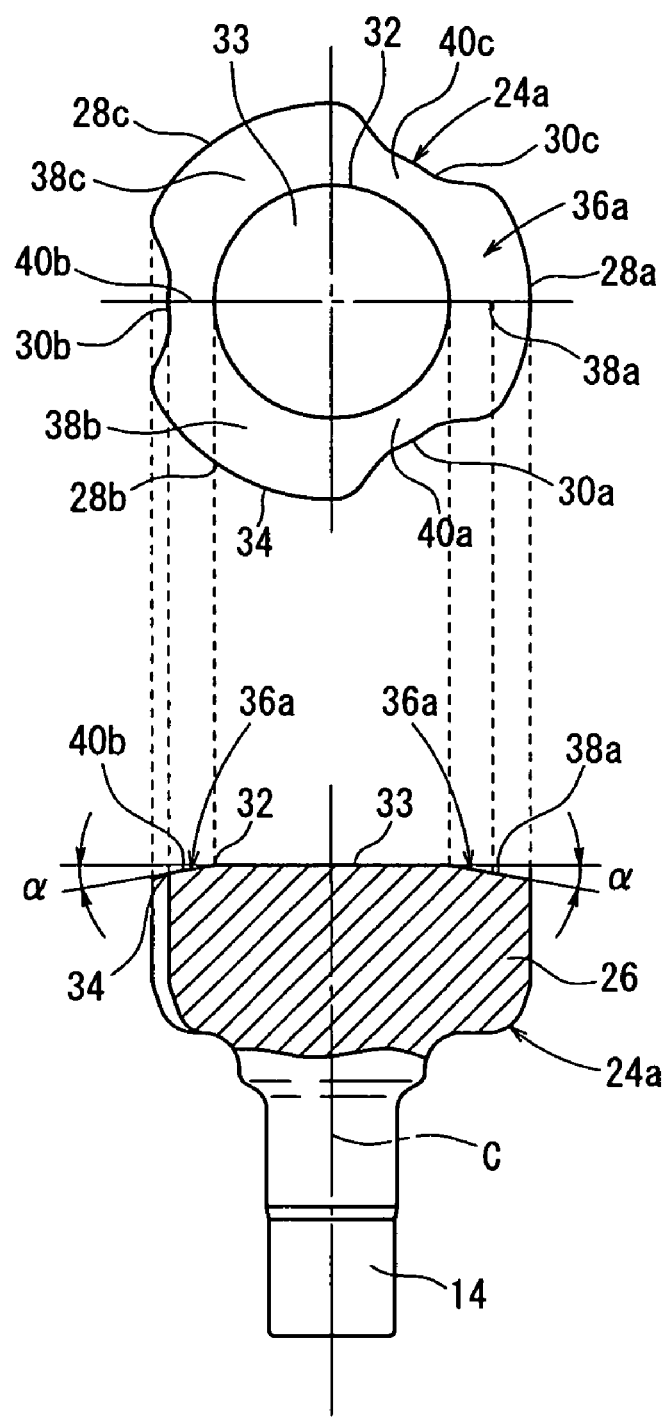
FIG. 14 is a side elevational view and a plan view of an intermediate preliminary formed body produced when a secondary formed body is upset in the process of manufacturing an outer race member for a constant-velocity joint according to the other embodiment.
Figure 15:
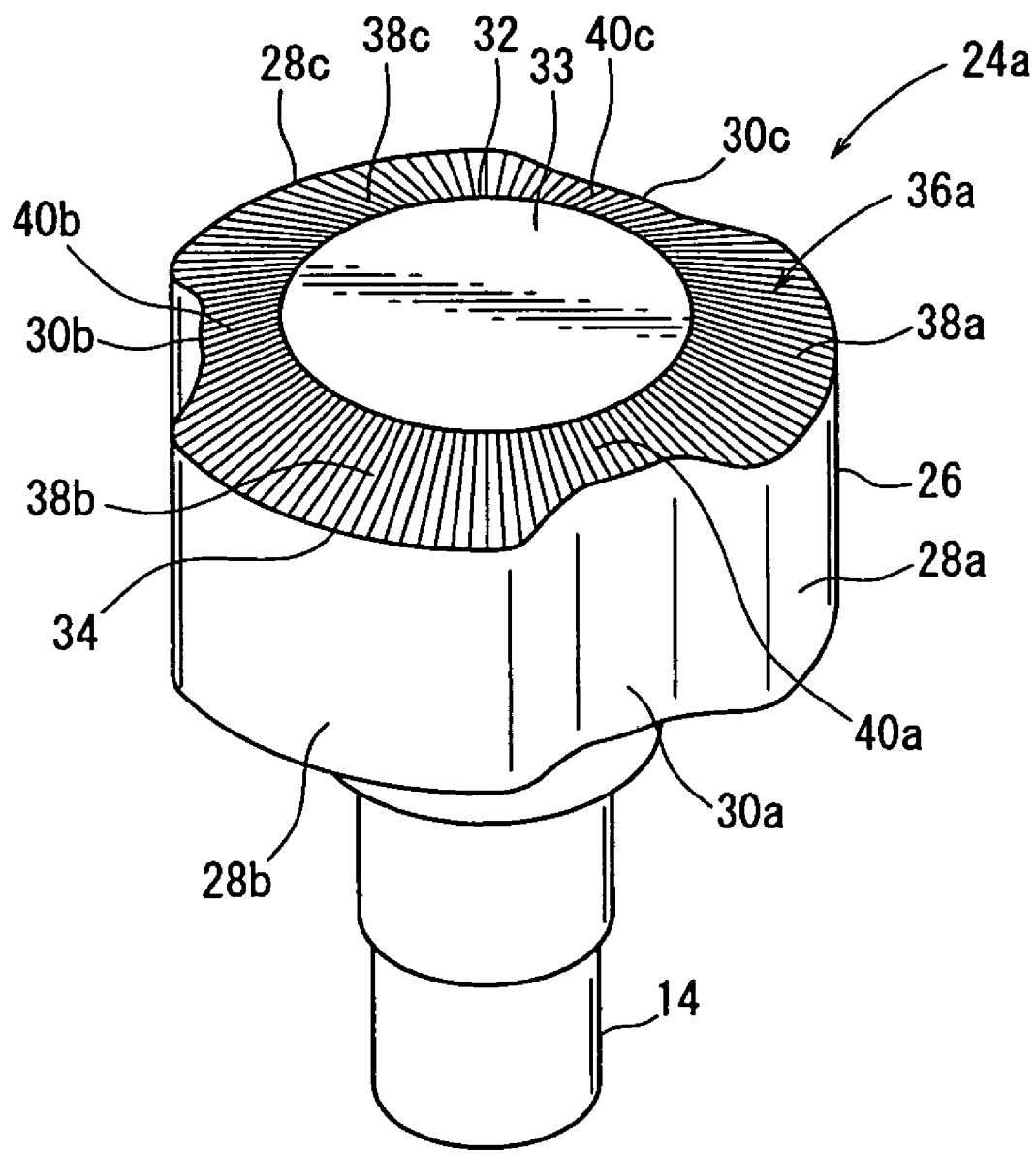
FIG. 15 is a perspective view of the intermediate preliminary formed body shown in FIG. 14.

In third cold forging step S3a according to the other embodiment, the upper portion 22 of the secondary formed piece 20 shown in FIG. 4 is further compressed into a greater diameter, producing an intermediate preliminary formed body 24a shown in FIGS. 14 and 15 as a tertiary formed piece.

Figure 16:
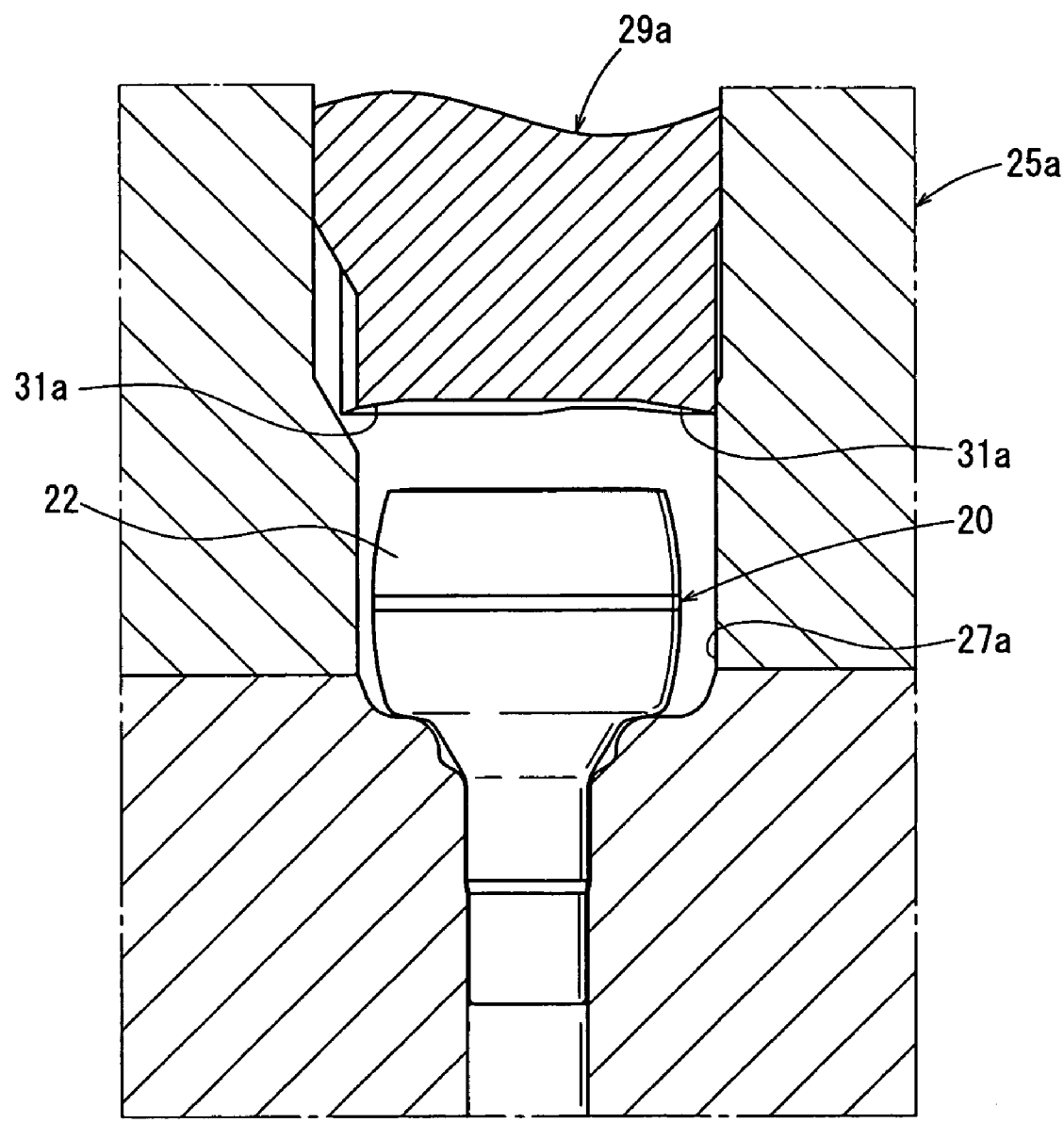
FIG. 16 is a vertical cross-sectional view, partly omitted from illustration, of a third forging die for forming the intermediate preliminary formed body shown in FIG. 14.

Specifically, a third forging die (preliminary forming die) 25a shown in FIG. 16 is used, and the upper portion 22 of the secondary formed piece 20 loaded in a cavity 27a is pressed by a punch 29a, producing the intermediate preliminary formed body 24a (tertiary formed piece) with the upper portion 22 being axially deformed under compression.

Figure 17:
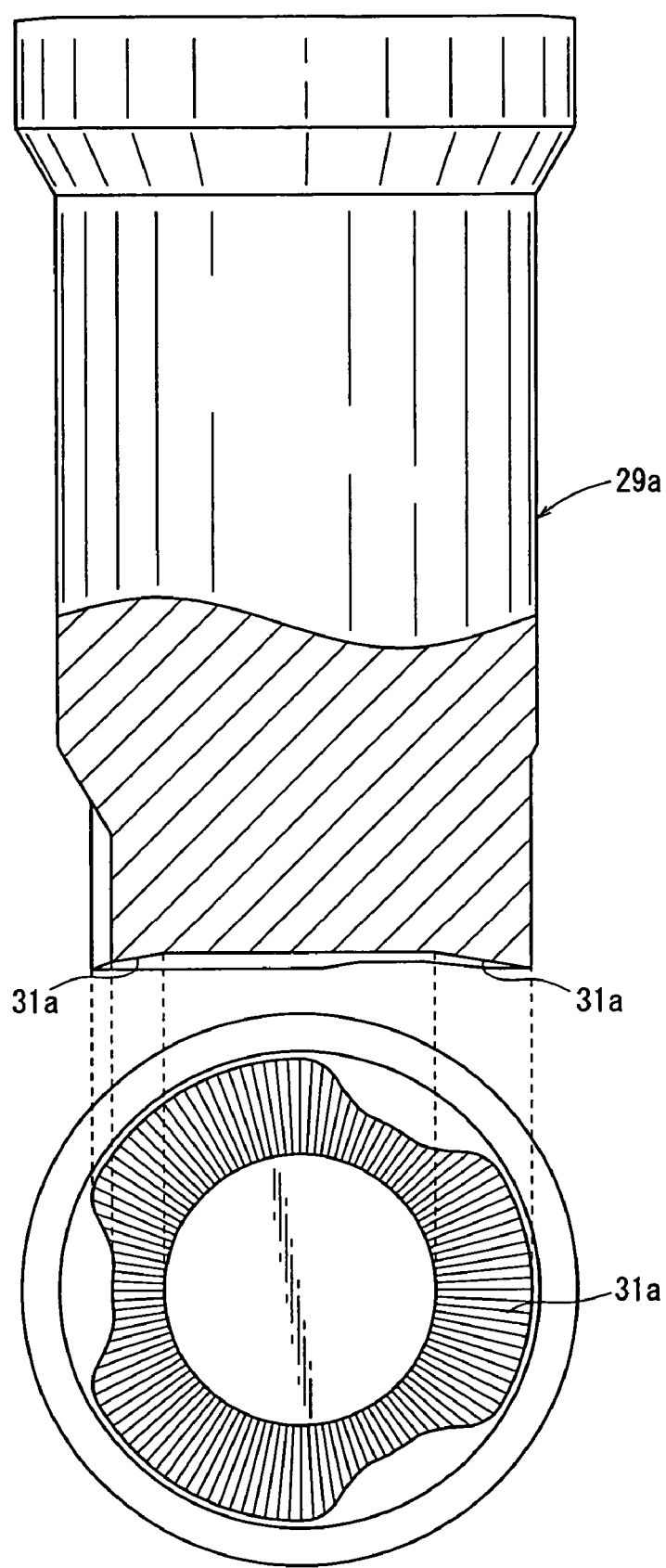
FIG. 17 is a side elevational view, partly cut away, and a bottom view of a punch of the third forging die shown in FIG. 16.

As shown in FIG. 17, the punch 29a has on its tip end face a slightly concave circular central area and an annular slanted surface forming portion 31a rising from the circular concave area radially outwardly toward a peripheral edge. The slanted surface forming portion 31a has a circumferential slanted surface whose tilt angle is uniform unlike the previous embodiment.

As shown in FIGS. 14 and 15, the intermediate preliminary formed body 24a comprises a disk-shaped head 26 thinner and larger in diameter than the upper portion 22 of the secondary formed piece 20, and a shank 14 reduced in diameter and integrally extending from a lower portion of the head 26.

As viewed in plan, the head 26 has three petal-shaped larger-diameter portions 28a through 28c projecting radially outwardly a predetermined length and angularly spaced about 120 degrees circumferentially, and three curved and recessed smaller-diameter portions 30a through 30c each disposed between adjacent ones of the larger-diameter portions 28a through 28c.

The head 26 has on its upper end a circular flat surface 33 and an annular slanted surface 36a extending around the circular flat surface 33 and disposed between a circular ridge 32 extending around the axis C (the central point of the circular flat surface 33) and a peripheral ridge 34 of the larger-diameter portions 28a through 28c and the smaller-diameter portions 30a through 30c.

The annular slanted surface 36a comprises a slanted surface which is lowered from the circular ridge 32 close to the center toward the radially outer peripheral ridge 34. The annular slanted surface 36a has a constant tilt angle around the larger-diameter portions 28a through 28c and the smaller-diameter portions 30a through 30c.

Specifically, the annular slanted surface 36a includes three first slanted facets 38a through 38c interconnecting the center (axis C) and the centers of the larger-diameter portions 28a through 28c, and the first slanted facets 38a through 38c have a tilt angle α of about 3 degrees with respect to the horizontal plane. The annular slanted surface 36a also includes three second slanted facets 40a through 40c interconnecting the center (axis C) and the centers of the smaller-diameter portions 30a through 30c, and the second slanted facets 40a through 40c also have a tilt angle α of about 3 degrees with respect to the horizontal plane as with the first slanted facets 38a through 38c. Between the first slanted facets 38a through 38c and the second slanted facets 40a through 40c, the tilt angle is set to the same tilt angle α as the first slanted facets 38a through 38c and the second slanted facets 40a through 40c.

The tilt angle α of the annular slanted surface 36a not limited to 3 degrees, but may be set to a value in the range from 3 degrees and 10 degrees, for example.

As shown in FIG. 14, the radial width of the annular slanted surface 36a is largest at the centers of the larger-diameter portions 28a through 28c and smallest at the centers of the smaller-diameter portions 30a through 30c. Therefore, the area of the annular slanted surface 36a at the larger-diameter portions 28a through 28c is greater than the area of the annular slanted surface 36a at the smaller-diameter portions 30a through 30c.

With the area of the annular slanted surface 36a at the larger-diameter portions 28a through 28c being greater than the area of the annular slanted surface 36a at the smaller-diameter portions 30a through 30c, it is easy for the plastically deformed material to flow from the smaller-diameter portions 30a through 30c toward the larger-diameter portions 28a through 28c.

After third cold forging step S3a is finished, as with the previous embodiment, the fourth forging die 42 shown in FIG. 11 is used to perform fourth cold forging step S4 for backward extrusion.

Usually, when a forging blank (workpiece) is extruded backwards, the amount of backward elongation (the amount of plastic flow) is smaller in the larger-diameter portions than in the smaller-diameter portions, tending to cause cracking, material localization, etc. due to different deformation resistances (ductilities) of the forging blank, for example.

According to the other embodiment, the annular slanted surface 36a with the constant tilt angle α extends peripherally along the larger-diameter portions 28a through 28c and the smaller-diameter portions 30a through 30c of the intermediate preliminary formed body 24a. Therefore, when the intermediate preliminary formed body 24a is extruded backwards, the plastically deformed material finds it easy to flow from the smaller-diameter portions 30a through 30c along the annular slanted surface 36a toward the larger-diameter portions 28a through 28c. Thus, the material flows better in the larger-diameter portions 28a through 28c than in the smaller-diameter portions 30a through 30c.

As the area of the annular slanted surface 36a at the larger-diameter portions 28a through 28c is greater than the area of the annular slanted surface 36a at the smaller-diameter portions 30a through 30c, a more material flow in the larger-diameter portions 28a through 28c is promoted than in the smaller-diameter portions 30a through 30c.

According to the other embodiment, therefore, the intermediate preliminary formed body 24a is shaped such that more material tends to flow in the larger-diameter portions 28a through 28c than in the smaller-diameter portions 30a through 30c. Consequently, the axial dimensions of the end face of the cup 62 at the larger-diameter portions 28a through 28c and the smaller-diameter portions 30a through 30c are substantially uniformized when the intermediate preliminary formed body 24a is extruded backwards.

As a result, according to the other embodiment, the quaternary formed piece 58 produced by the backward extrusion is prevented from suffering material localization and the larger-diameter portions 28a through 28c have their material plastically flowing well, thereby reducing the amount of finishing work (the amount of cutting work) in a subsequent step.

According to the other embodiment, as described above, the intermediate preliminary formed body 24a (tertiary formed piece) is formed prior to fourth cold forging step S4 for performing backward extrusion, thereby increasing the product accuracy of a completed product to be formed in a subsequent step and reducing the amount of finishing work in a subsequent step.

With the manufacturing process according to the other embodiment, prior to the backward extrusion in fourth cold forging step S4, the intermediate preliminary formed body 24a having the annular slanted surface 36a whose tilt angle is constant at the larger-diameter portions 28a through 28c and the smaller-diameter portions 30a through 30c is formed to increase the product accuracy and quality stability of the completed product 64.

The invention claimed is:

1. A method of manufacturing an outer race member for a tripod-type constant-velocity joint having a shank and a cup which are integrally formed by cold forging, comprising the steps of:
    extruding forwards a cylindrical workpiece cut to a predetermined length to form a primary formed body having a shank;
    preliminarily upsetting an upper portion of said workpiece except said shank thereof to form a secondary formed body;
    further upsetting an upper portion of said secondary formed body except said shank thereof to form an intermediate preliminary formed body having an annular slanted surface which provides a material-flow resistance difference between larger-diameter portions and smaller-diameter portions thereof;
    extruding backwards said intermediate preliminary formed body to form a quaternary formed body having a cup with track grooves defined therein; and
    ironing said cup of said quaternary formed body.

2. A method according to claim 1, wherein said intermediate preliminary formed body has a disk-shaped head which is thinner and larger in diameter than said upper portion of said secondary formed body, said head having, as viewed in plan, a plurality of larger-diameter portions projecting radially outwardly and angularly spaced a predetermined angle circumferentially, and a plurality of curved and recessed smaller-diameter portions each disposed between adjacent ones of said larger-diameter portions.

3. A method according to claim 2, wherein said head has on an upper end thereof an annular slanted surface having a tilt angle with respect to a horizontal plane, said tilt angle varying continuously circumferentially.

4. A method according to claim 3, wherein said annular slanted surface has a tilt angle α at said larger-diameter portions and a tilt angle β at said smaller-diameter portions , said tilt angle β being greater than said tilt angle α to cause said larger-diameter portions and said smaller-diameter portions to have different amounts of backward plastic flow depending on a material-flow resistance difference between said larger-diameter portions and said smaller-diameter portions when said intermediate preliminary formed body is extruded backwards in the next step.

5. A method according to claim 4, wherein the difference between the tilt angle α of said larger-diameter portions and the tilt angle β of said smaller-diameter portions is in the range from 3 degrees to 12 degrees.

6. A method according to claim 3, wherein said annular slanted surface has a radial width which is largest at the centers of said larger-diameter portions and smallest at the centers of said smaller-diameter portions.

7. A method of manufacturing an outer race member for a tripod-type constant-velocity joint having a shank and a cup which are integrally formed by cold forging, comprising the steps of:
    extruding forwards a cylindrical workpiece cut to a predetermined length to form a primary formed body having a shank;
    preliminarily upsetting an upper portion of said workpiece except said shank thereof to form a secondary formed body;
    further upsetting an upper portion of said secondary formed body except said shank thereof to form an intermediate preliminary formed body having an annular slanted surface which extends circumferentially along a plurality of larger-diameter portions and a plurality of smaller-diameter portions thereof and which provides a constant tilt angle in said larger-diameter portions and said smaller-diameter portions thereof;
    extruding backwards said intermediate preliminary formed body to form a quaternary formed body having a cup with track grooves defined therein; and
    ironing said cup of said quaternary formed body.

8. A method according to claim 7, wherein said intermediate preliminary formed body has a disk-shaped head which is thinner and larger in diameter than said upper portion of said secondary formed body, said head having, as viewed in plan, a plurality of larger-diameter portions projecting radially outwardly and angularly spaced a predetermined angle circumferentially, and a plurality of curved and recessed smaller-diameter portions each disposed between adjacent ones of said larger-diameter portions.

9. A method according to claim 8, wherein said head has on an upper end thereof a circular flat surface and an annular slanted surface extending around said circular flat surface and having a constant tilt angle α with respect to a horizontal plane circumferentially along said larger-diameter portions and said smaller-diameter portions.

10. A method according to claim 9, wherein the area of said annular slanted surface at said larger-diameter portions is greater than the area of said annular slanted surface at said smaller-diameter portions.

* * * * *